United States Patent [19]
Rieder et al.

[11] Patent Number: 5,214,280
[45] Date of Patent: May 25, 1993

[54] PHOTOELECTRIC POSITION DETECTOR WITH OFFSET PHASE GRATING SCALES

[75] Inventors: Heinz Rieder, Oberndorf; Max Schwaiger, Ostermiething, both of Austria

[73] Assignee: RSF-Elektronik Gesellschaft m.b.H., Tarsdorf, Austria

[21] Appl. No.: 866,907

[22] Filed: Apr. 10, 1992

[30] Foreign Application Priority Data

Apr. 18, 1991 [AT] Austria ................................ 813/91

[51] Int. Cl.$^5$ .............................................. H01J 3/14
[52] U.S. Cl. ............................ 250/237 G; 250/231.16
[58] Field of Search ................ 250/231.13, 231.14, 250/231.16, 237 G; 356/374, 375, 358

[56] References Cited

U.S. PATENT DOCUMENTS 5,068,530  11/1991  Ieki et al. ........................ 250/231.16
5,120,132   6/1992  Spies et al. ....................... 250/237 G

FOREIGN PATENT DOCUMENTS 223009  5/1987  European Pat. Off. .
163362  6/1988  European Pat. Off. .
387481  9/1990  European Pat. Off. .
2316248  10/1974  Fed. Rep. of Germany .
1474049   5/1977  United Kingdom .

*Primary Examiner*—David C. Nelms
*Attorney, Agent, or Firm*—Collard & Roe

[57] ABSTRACT

In a photoelectric position detector a scanning movement of a scanning phase grating relative to a scale member which is provided with a reflective phase grating is detected, light emitted by at least one light source is diffracted by the scanning grating and as it is reflected by the scale member and then again by the scanning grating to form an interference pattern and only groups belonging to said interference pattern and being of a predetermined diffraction order are detected by respective photodetectors and are converted by them to phase-displaced photodetector signals, which are cyclically changed as the scanning grating is moved relative to the scale member. The scale member is provided with two juxtaposed phase grating scales, which are offset from each other by ¼ of their grating constant, the scanning grating is associated with both scales, and two photodetectors are associated with each scale and adapted to detect the interference of the light beams diffracted toward said photodetectors and in response to said detection to generate photodetector signals having a phase displacement particularly of 180°, wherein each of said photodetector signals and the corresponding photodetector signal derived from the other scale are displaced 90° in phase owing to the offset of the scales.

10 Claims, 6 Drawing Sheets

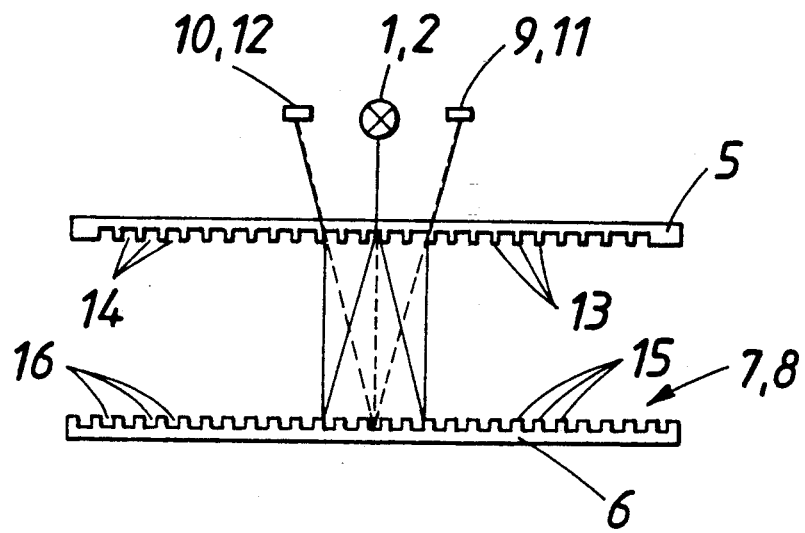
FIG. 1
FIG. 2
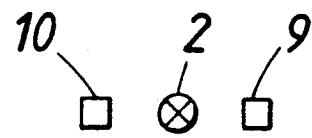
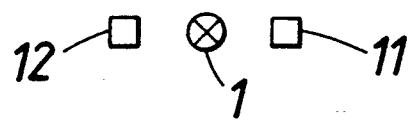

PHOTOELECTRIC POSITION DETECTOR WITH OFFSET PHASE GRATING SCALES

BACKGROUND OF THE INVENTION

1. Field of the Invention

This invention relates to a photoelectric position detector in which a scanning movement of a scanning phase grating relative to a scale member which is provided with a reflective phase grating is detected, light emitted by at least one light source is diffracted by the scanning grating and as it is reflected by the scale member and then again by the scanning grating to form an interference pattern and only groups belonging to said interference pattern and being of a predetermined diffraction order are detected by respective photodetectors and are converted by them to phase-displaced photodetector signals, which are cyclically changed as the scanning grating is moved relative to the scale member.

2. Description of the Prior Art

The basic principle of such position detectors is known from British Patent Specification 1,474,049. In those known detectors, the zero order group, i.e., the undiffracted group of the diffraction image and groups thereof which have positive and negative phase displacements of the same magnitude are received by the photodetectors and the resulting photodetector signals can be evaluated for a detection of the direction of movement of the scanning grating relative to the reflective phase grating of the scale member, and of the extent of the movement of the scanning grating. In accordance with Published German Application 23 16 248 a similar system comprises three photodetectors, which detect the zero-order group and the first-order positive and negative groups of the diffraction pattern. A special embodiment of the last-mentioned system is known from EP-B-0 163 362 and comprises a special scanning grating, in which the ratio of the rib and groove widths differs from unity and is, e.g., of an order of 1:3, and the rib height is correspondingly determined and the photodetectors are so arranged that the sensitivity to a change of the phase displacement by changes of the distance between the gratings and by a reception of the zero-order and positive and negative first-order diffraction groups is reduced because three photodetector signals are generated, which have a phase displacement which is as close as possible to 120°. Whereas the desired phase displacement can substantially be achieved by the last-mentioned position detector it has essential disadvantages just as all other known position detectors of that kind. In the first place the absolute amplitude or the absolute change of the amplitude of the photodetector signals may change in dependence on the illuminance, on the distance between the gratings and on the optical losses involved in the measuring operation and for this reason the photodetector signals must be normalized before they can be evaluated. Besides, measured-value signals which can be used for a measurement of lengths and angles cannot directly be derived from three signals displaced 120° in phase but said three signals must be shaped and converted by a computation to two sinusoidal analog signals, which are displaced 90° in phase and from which countable digital signals can be derived by methods which are conventionally employed in normal incremental measuring systems and can be used to control bidirectional counters and subsequently for an indication of the linear or rotational movement which has been performed.

In position detectors of a different kind it is shown that interference caused by internal reflection can be avoided in that at least one transparent phase grating is provided and the diffracted partial beams are directed back to photodetectors by an optical deflector through the grating or gratings at a distance from the region on which the light is initially incident. In such position detectors a laser is preferably used as a light source. Thereafter, zero-order diffraction patterns and positive and negative n-th-order diffraction patterns are detected and used for a generation of three photodetector signals, which are displaced 120° in phase and from which measured-value signals are derived by the above-mentioned shaping and computational conversion. It is known from EP-A-0 387 481 to provide only one phase grating on the scale member, to use transmitted light and to direct two coherent partial light beams onto the phase grating at angles to the normal so that said partial beams are diffracted by the grating and interfere with each other and photodetector signals can be derived from the interference pattern by photodetectors of a measuring apparatus. In systems comprising two gratings it is also known so to direct the light that it is incident on the first grating at a given angle so that the direction of movement can be more readily detected by the measurement and sufficiently differentiated diffraction patterns are generated for being detected by the photodetectors.

From EP-A-0 223 009 it is known to provide on the scanning member two phase gratings, which are arranged one behind the other and offset in phase by one-fourth of the grating constant and which have a rib-groove width ratio differing from 1:1. In that case the measuring range extends over a relatively large length of the scale member and the arrangement is expensive but affords the advantage that a normalization of signals can be effected in that the signals generated by the photodetectors are combined. Three photodetectors are provided for each grating and are used to detect the light beams diffracted onto said photodetectors.

SUMMARY OF THE INVENTION

It is an object of the invention to provide a photoelectric position detector which is of the kind described first hereinbefore and is simple in design and substantially insensitive to fluctuations of the absolute amplitude of the photodetector signals and in which the photodetector signals can be converted by simple means to measured-value signals which can be processes further and particularly consist of countable digital signals.

The object set forth is generally accomplished in that the scale member is provided with two juxtaposed phase grating scales, which are offset from each other by ¼ of their grating constant, the scanning grating is associated with both scales, and two photodetectors are associated with each scale and adapted to detect the interference of the light beams diffracted toward said photodetectors and in response to said detection to generate photodetector signals having a phase displacement particularly of 180°, wherein each of said photodetector signals and the corresponding photodetector signal derived from the other scale are displaced 90° in phase owing to the offset of the scales.

The basic concept of the invention resides in that the provision of two scales on the scale member permits the generation of two photodetector signals which are displaced exactly 90° in phase by photodetectors which are juxtaposed in a row extending transversely to the direction of the scanning movement so that it is not necessary to detect by a separate photodetector the interference of the diffraction order at right angles to the direction of the scanning movement. Besides, the gratings can be designed to have such a rib-groove widths ratio and such a groove depth that two photodetector signals displaced 180° in phase can be generated in response to the scanning of each scale.

As a result, the position detector in accordance with the invention will generate the four signals which are conventionally generated in incremental measuring operations, namely:

$$I = A + B \cos (2f) \quad\quad III = A + B \cos (2f + 90°)$$
$$II = A + B \cos (2f + 180°) \quad IV = A + B \cos (2f + 270°)$$

$$\text{wherein } f = \frac{2\pi}{g} x$$

x is the extent of the scanning movement, g is the grating constant of the scales and A and B are constants.

The signals I, II and III, IV generated by the photodetectors arranged in a longitudinal row can be processed by an antiparallel circuit to remove the d. c. voltage component so that the measured-value signal is substantially independent of the absolute amplitude of the photodetector signals and the result of the measurement will hardly be influenced by the optical transmittance of the gratings and by changes of the illuminance. The sinusoidal signals delivered by the antiparallel circuits will constitute analogous measured-value signals which lead or lag each other in dependence on the direction of the scanning movement and can be used to generate countable digital signals. The evaluating circuits which may be used may be basically identical to those employed in conventional incremental measuring systems, in which the scale is photoelectrically scanned through two gratings which are offset in phase from each other. It will be understood that in the position detector in accordance with the invention the scale member may be provided not only with the above-mentioned scales but also with reference marks, which desirably also constitute phase gratings and can be detected by a cooperation with associated scanning gratings and photodetectors, which in that case preferably detect the zero-order groups derived from the interference pattern.

The position detector in accordance with the invention can be embodied in various ways. Separate light sources may be associated with the two scales and should be as perfectly monochromatic as possible and should be succeeded in case of need by a collimator but may alternatively consist of lasers. It will be sufficient to emit light only as a narrow beam in each case.

A different embodiment comprises a common light source and optical deflecting means for distributing the light emitted by said light source to the scanning grating portions associated with the two scales of the scale member and the respective photodetectors. According to a desirable further feature the optical deflecting means comprise a diffraction grating for fanning the light beam from a light source at right angles to the direction of the scanning movement. Such a diffraction grating may be so arranged and may have such a grating constant that a major part of the light which is incident on said diffraction grating will fall on the photodetectors. The scanning grating, the widths of its ribs and grooves, and the depth of its grooves may be so selected in dependence on the wavelength of the light employed that a large part of the light will be diffracted to form diffraction groups of the desired order in the diffraction pattern and for this reason will be utilized for the measurement.

In a different embodiment, deflecting prisms for distributing the light from the light source to the scales may be provided on that side of the scanning grating which faces the light source.

In another arrangement, which is particularly desirable for use with conventional divergent light sources, a condensor lens assembly is provided, which intercepts the light path from the light source to the phase gratings and the light beams for the selected-order groups of the interference pattern and which concentrates also those parts of the interference pattern which are incident on the photodetectors. In a modification, separate condensor lenses, which are associated with respective ones of the scales, are arranged between the light source and the scanning gratings.

In a modification of the position detector in accordance with the invention the reflective scale member is replaced by a transparent scale member and an optical reversing prism is provided by which the light which has been diffracted by the scanning grating and transmitted by the scales is reflected to be diffracted further by the scales and the scanning grating and then to be incident on the photodetectors, As has been mentioned hereinbefore in the discussion of the prior art such a reversing prism will reduce the influence of internal reflections on the measuring operation. But a reversing prism of said kind may also be used to effect a generation of reference pulses in response to the scanning of reference marks. To that end, a reference mark may be constituted on the scale member by two gratings which are longitudinally spaced apart in dependence on the length of the path on which the light is reversed in the reversing prism and can cooperate with further gratings on the scanning member so that a reference mark photodetector will generate a reference signal only in response to the reception of light which has been diffracted toward said photodetector by the first reference mark grating, the reversing prism, the second reference mark grating and the associated gratings of the scanning member.

Further details and advantages of the invention will become apparent from the following detailed description of the drawings.

BRIEF DESCRIPTION OF THE DRAWINGS

FIG. 1 is a highly schematic side elevation showing a position detector in accordance with the invention.

FIG. 2 is a top plan view showing the position detector of FIG. 1 and illustrating the arrangement of light sources and photodetectors relative to each other.

DETAILED DESCRIPTION OF THE PREFERRED EMBODIMENTS

Figure 3:
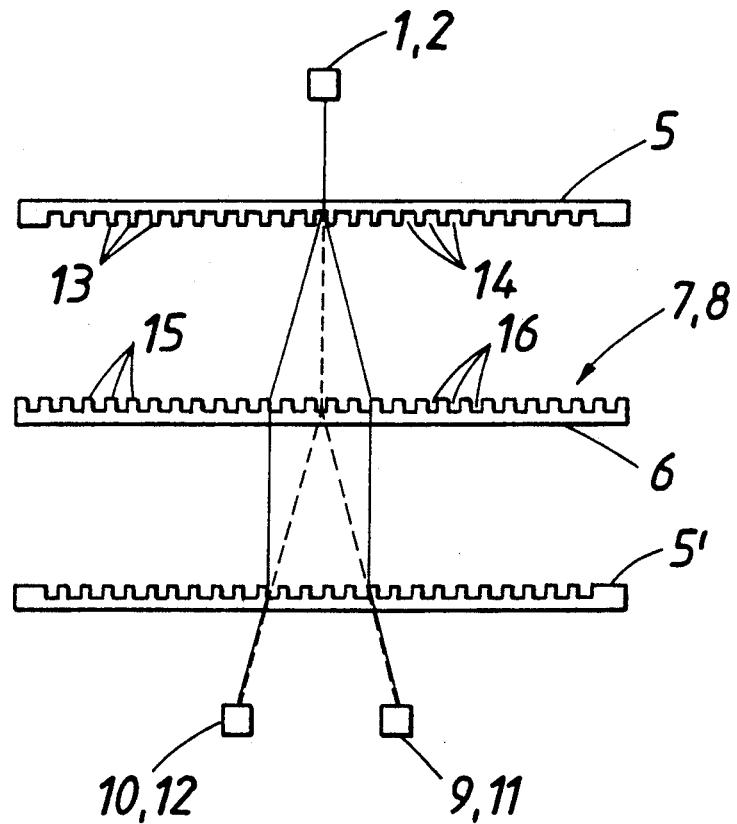
FIG. 3 is a schematic side elevation which is similar to FIG. 1 and illustrates an embodiment having different illuminating means. To facilitate the understanding of the mode of operation the scanning grating member is shown twice for transmitting the light beams before and behind the scale member, which is assumed to be transparent.
Figure 4:
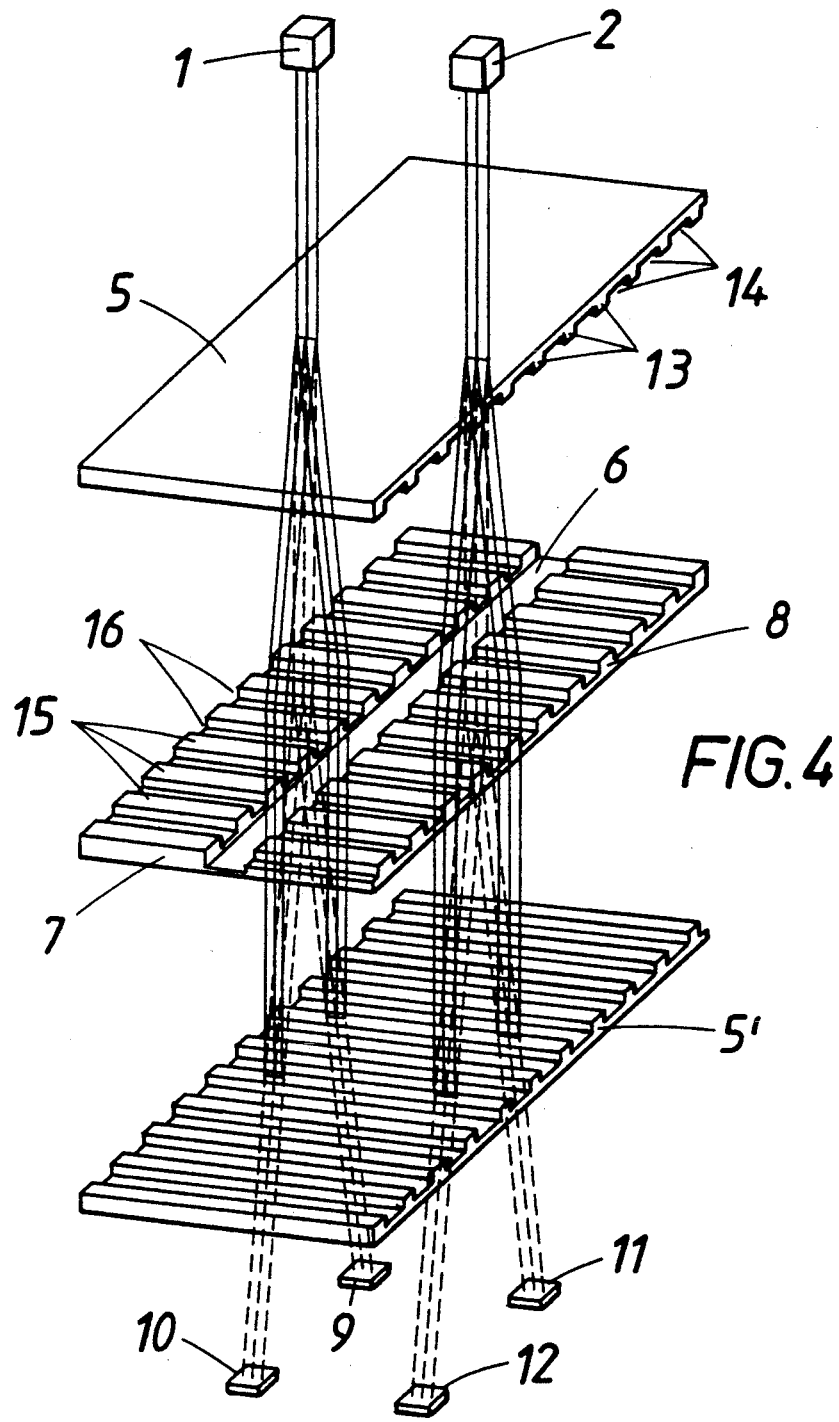
FIG. 4 is a perspective view showing the position detector of FIG. 3.

In FIGS. 1 to 8 of the drawings identical parts are designated by like reference characters. The position detector comprises light sources 1, 2, which may consist of LCD's, incandescent lamps, laser diodes, or lasers, and further comprises a scanning optical phase grating 5, which is assumed to be duplicated at 5', a scale member 6 having two phase grating scales 7 and 8, and two photodetectors 9, 10, 11, 12 associated with the two scales. In FIGS. 1 to 5 and 9 the collimator lenses have not been shown for the sake of simplicity. In the other figures they have been indicated in that the light sources 1, 2 are represented by rectangles.

The scanning phase grating 5 comprises ribs 13, which are narrower than the grooves 14 between the ribs. On the other hand, the scales 7, 8 on the scale member consist of phase gratings in which the ribs 15 and the grooves 16 have the same width. In the embodiments shown by way of example the scanning grating and the scales have the same grating constant, i.e., the total width of a rib and groove is the same, but embodiments can be conceived in which the grating constant of the scales 7, 8 differs from the grating constant of the scanning grating 15. The two scales 7, 8 of the scale member 6 are offset from each other by ¼ of their grating constant. According to FIGS. 1 to 4 a separate light source 1 or 2 is associated with each scale 7 or 8. The light emitted by said light sources is diffracted as it exits from the scanning grating 5 and is thus fanned in the direction of the scanning movement. The reflection and diffraction of the light by the grating scales 7, 8 results in the generation of a diffraction pattern, which is incident on and diffracted once more by the scanning grating 5. The photodetectors 9, 10 and 11, 12 are arranged to detect the interference pattern of the light beams which have been diffracted toward the photodetectors and the scanning grating 5 is so designed that the photodetector signals generated by the photodetectors 9 and 10 are displaced 180° in phase and the signals generated by the photodetectors 11 and 12 are also displaced 180° in phase. A scanning movement of the scanning grating 5 relative to the scale member 6 will result in a change of the intensity of the light which is incident on the photodetectors 9 to 12 also in dependence on the direction of the scanning movement so that the direction of the scanning movement can be determined from the photodetector signals. The photodetectors 9, 11 and 10, 12, respectively, are arranged in transverse rows and owing to the offset of the scales 7, 8 generate signals which are displaced 90° in phase. The photodetectors 9, 10 and 11, 12 are included in antiparallel circuits, which generate signals which are substantially independent of disturbing influences caused by a change of the total illuminance and a change of the optical density in the light path. Said signals are basically sinusoidal and have a signal train length which is one-half of the length corresponding to the grating constant of the scales 7, 8. By known methods the signals may be amplified and shaped and, e.g., by means of trigger circuits may be converted to countable digital signals for use, e.g., in the control of displays or machine control systems.

In the illustrated embodiments the scales 7 and 8 are linear and extend throughout the length in which the measurement is to be taken but it will be possible to use also a circular scale member 6 for a measurement of angles. Such circular scale member 6 may be constituted by a cylindrical drum. In addition to the scales 7 and 8 the scale member may be provided with reference marks, which may be disposed between the scales 7, 8 or on both sides thereof. In that case the scanning member which carries the scanning grating will be provided with marks for coacting with the reference marks and reference mark photodetectors may be provided, which are associated with said reference marks and cooperating marks and move in unison with said scanning member and are arranged to generate a reference pulse when the scanning member is in a predetermined zero position relative to the scale member.

It will be understood that in the drawings the grating 5 and the scales 7, 8 are exaggerated as regards the width of the ribs and grooves and the depth of the grooves. In practice the gratings will have a grating constant of an order of micrometers or less and rib heights which are even smaller than the grating constant. The rib height and the rib-to-groove widths ratio of the scanning grating 5 will be selected also in dependence on the wavelength of the light which is employed.

Figure 5:
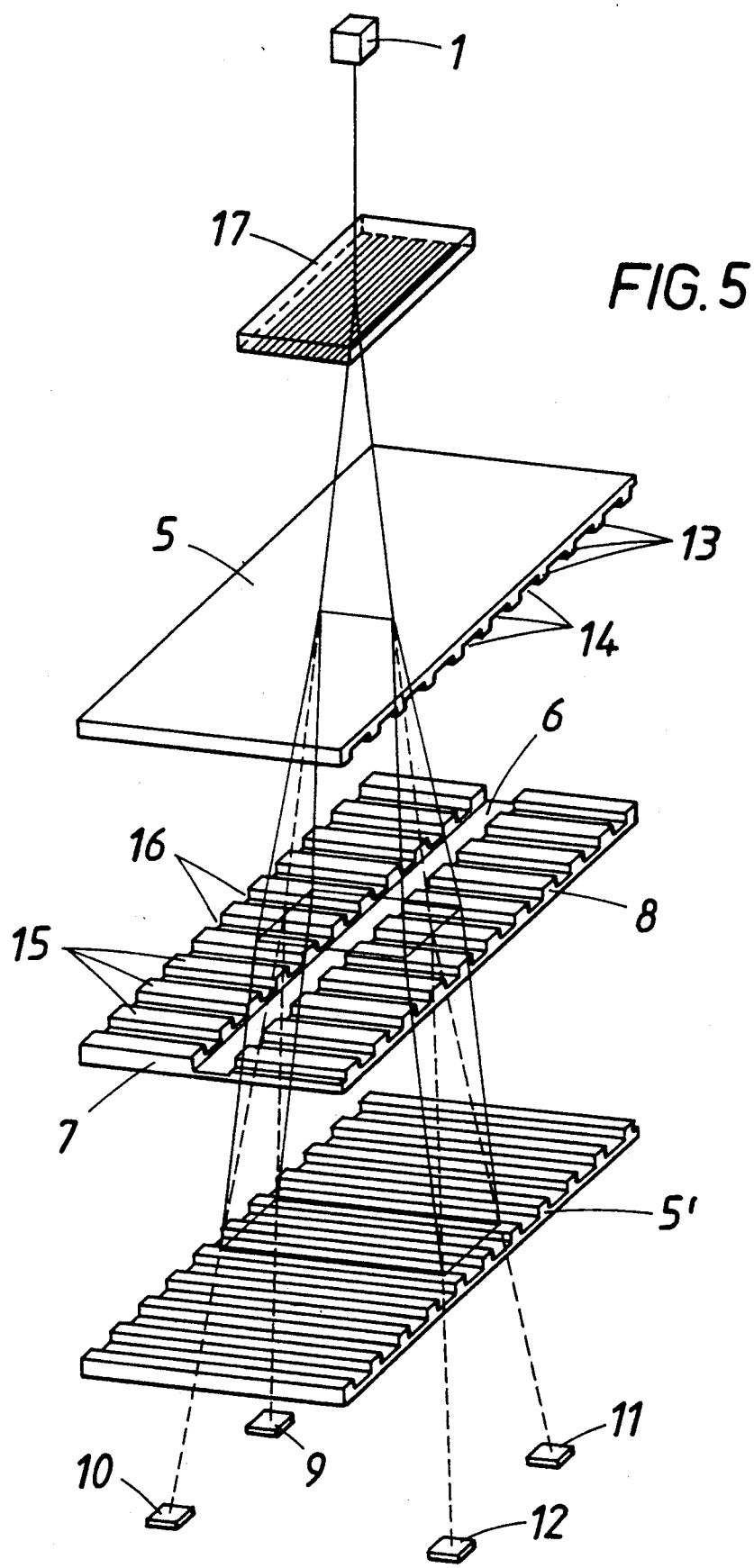
FIG. 5 is a view that is similar to FIG. 4 and illustrates an embodiment comprising only one light source.

Only a single light source 1 is provided in the embodiment shown in FIG. 5 and emits a light beam which by an optical diffraction grating 17 is fanned transversely to the longitudinal direction of the grating 5. When said partial light beams have been fanned and have been diffracted by the grating 5 for the first time they are incident on the two scales, by which they are reflected and diffracted further, and are finally transmitted once more through the grating (at 5') onto the photodetectors 9, 10, 11, 12.

In a similar arrangement shown in FIG. 6, the light emitted by a light source 1 is collected by a condenser lens assembly 18 and is subsequently fanned by the grating 17. The partial beams of the selected groups of the interference pattern are transmitted by the condenser lens assembly once more before they are incident on the photodetectors 9 to 12.

Figure 6:
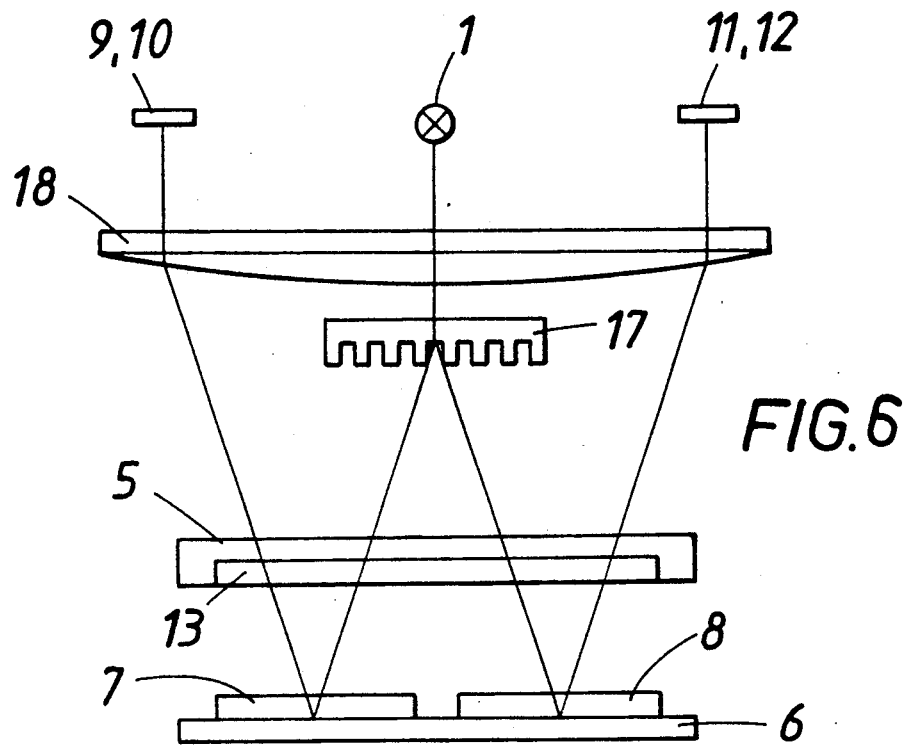
FIG. 6 is a schematic and elevation showing a modification of the embodiment shown in FIG. 1.
Figure 7:
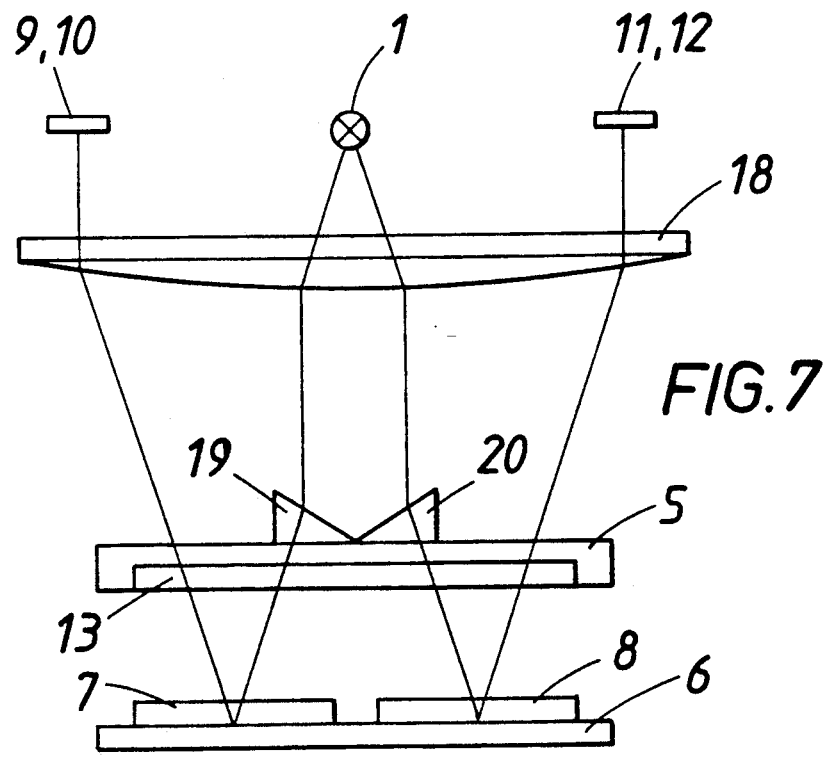
FIG. 7 is a schematic end elevation showing a different embodiment.

In the embodiment shown in FIG. 7 the optical grating 17 shown in FIGS. 5 and 6 has been replaced by two triangular prisms 19, 20, by which the light beam is deflected to fall through the grating 5 onto the scales 7, 8.

Figure 8:
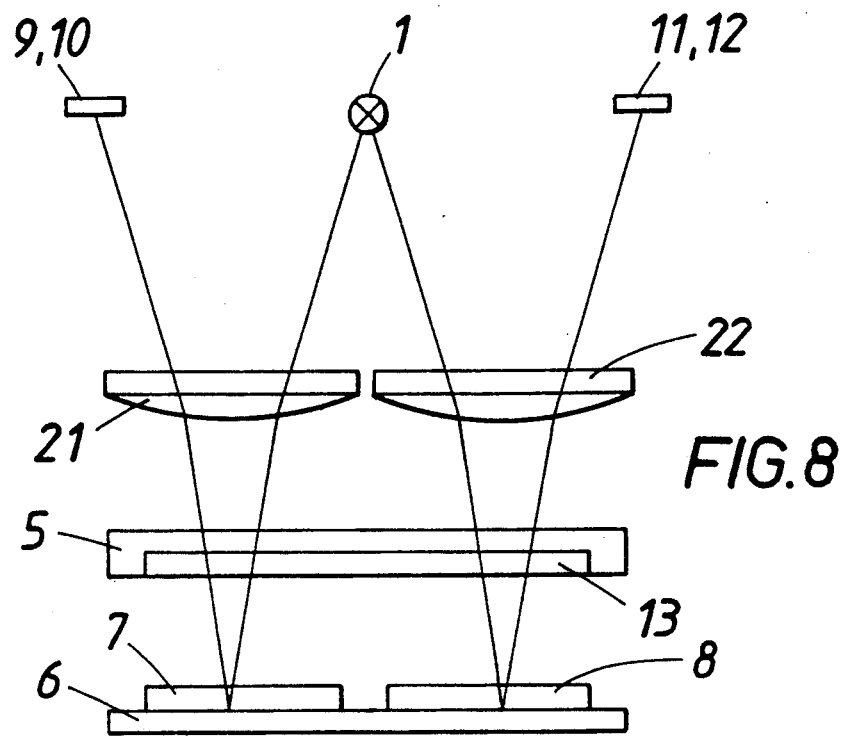
FIG. 8 is a schematic end elevation showing a further embodiment.

In the embodiment shown in FIG. 8 a separate condenser lens assembly 21 or 22 is associated with each of the scales 7 and 8 and with the associated photodetectors 9, 10 and 11, 12, respectively. By said condenser lens assemblies 21, 22 the light emitted by the light source 1 is separately directed to fall through the grating 5 onto the scales 7 and 8 and the selected groups of the interference pattern are thus caused to be incident on the photodetectors 9, 10 and 11, 12, respectively.

Figure 9:
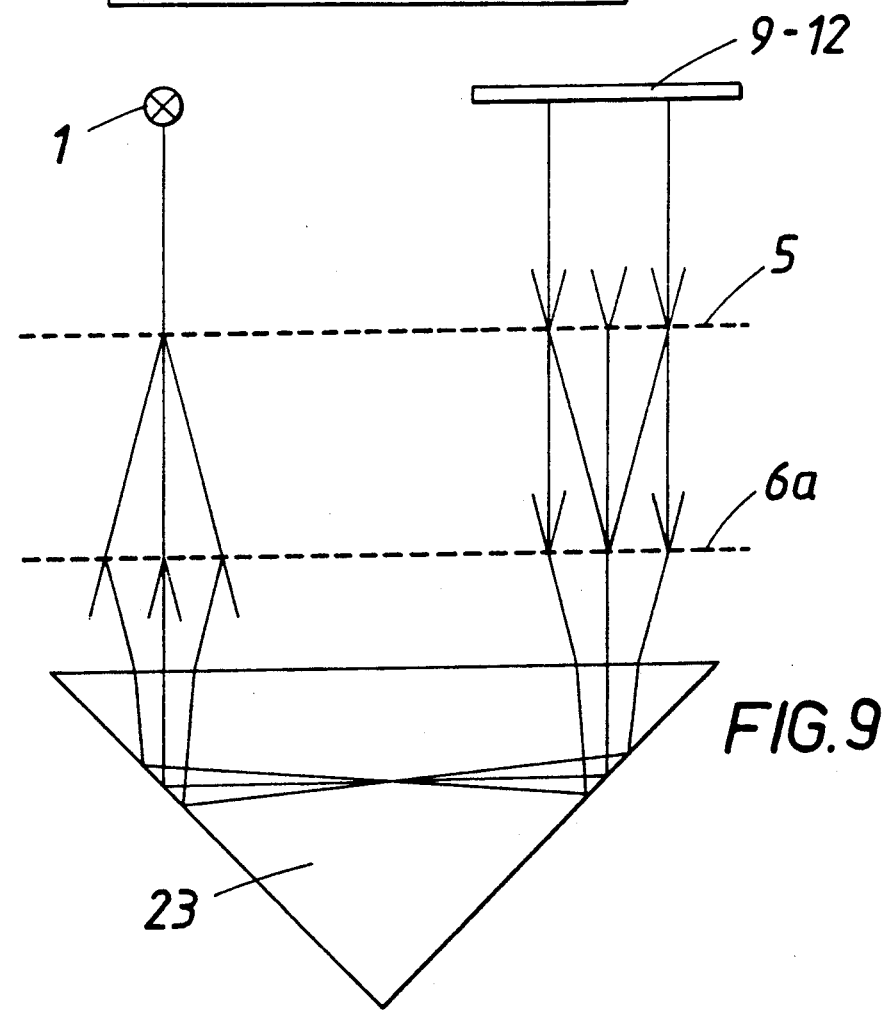
FIG. 9 is a schematic representation of a position detector comprising a transparent scale member and a reversing prism.

In the embodiment shown in FIG. 9 the reflective scale member 6 shown in FIGS. 1 to 8 has been replaced by a transparent scale member 6a, which on the side facing the scanning grating is also provided with two mutually offset scales, which are constituted by optical diffraction gratings. The light emitted by the light source 1 is diffracted by the scanning grating 5 and is then transmitted by the scales of the scale member 6a and is thus diffracted further with generation of an interference pattern and is then directed by a reversing triangular prism 23 in the longitudinal direction of the scales 7 and 8 and subsequently onto the scale member 6a and is transmitted and re-diffracted by the latter and is finally diffracted once more by the grating 5 before it is incident on the photodetectors 9 to 12.

We claim:

1. In a photoelectric position detector comprising illuminating means,
   a scale member provided with phase grating scale means,
   a scanning member, which is operable to perform relative to said scale member a scanning movement along said phase grating scale means and is provided with a scanning phase grating, which is arranged to transmit light from said illuminating means onto said phase grating scale means and subsequently to receive said light from said phase grating scale means, wherein
   said light is diffracted by said phase grating scale means and by said scanning phase grating before and after said light has been incident on said phase grating scale means and an interference pattern is thus generated, which comprises diffraction groups of different orders, and
   a plurality of photodetectors are provided, each of which is arranged to receive only diffraction groups of a predetermined order of said interference pattern and in response to the reception of said diffraction groups is operable to generate phase-displaced photodetector signals, which are cyclically changed by said scanning movement,
   the improvement residing in that
   said phase grating scale means consist of two juxtaposed phase grating scales, which have a predetermined grating constant and are offset by ¼ of said grating constant and are both arranged to receive light from said illuminating means through said scanning phase grating,
   one pair of said photodetectors are associated with each of said scales and arranged to receive only diffraction groups of respective predetermined orders of said interference pattern from said associated scale and operable to generate phase-displaced photodetector signals in response to such reception, and
   corresponding photodetectors of said two pairs are arranged to generate photodetector signals which are displaced 90° in phase owing to said offset of said scales.

2. The improvement set forth in claim 1 as applied to a position detector in which said phase grating scale means are reflective and arranged to reflect through said scanning phase grating to said photodetectors said light which has been transmitted through said scanning phase grating onto said phase grating scale means.

3. The improvement set forth in claim 1, wherein the photodetectors of each of said pairs are arranged to generate signals which are displaced 180° in phase.

4. The improvement set forth in claim 1, wherein said illuminating means comprise two light sources for illuminating respective ones of said phase grating scales through said scanning phase grating.

5. The improvement set forth in claim 1, wherein said illuminating means comprise a common light source and optical deflecting means for distributing light emitted by said light source through said scanning phase grating to said two scales through different regions of said scanning phase grating.

6. The improvement set forth in claim 5, wherein said optical deflecting means comprise a diffraction grating arranged to fan the light from said light source at right angles to the direction of said scanning movement.

7. The improvement set forth in claim 5, wherein said optical deflecting means comprise two deflecting prisms, which are provided on said scanning member and arranged to direct the light from said light source through said scanning phase grating onto said two scales.

8. The improvement set forth in claim 1, wherein a condensor lens assembly is provided and is arranged to deflect the light between said illuminating means and said scanning phase grating and between said scanning phase grating and said photodetectors.

9. The improvement set forth in claim 1, wherein
   a first condenser lens is provided, which is arranged to deflect the light between said illuminating means and one of said scales and between said scanning phase grating and said pair of photodetectors associated with said one scale, and
   a second condenser lens is provided, which is arranged to deflect the light between said illuminating means and the other of said scales and between said scanning phase grating means and said pair of photodetectors associated with said other scale.

10. The improvement set forth in claim 1, wherein
    said scales are transparent and arranged to transmit said light which has been emitted by said illuminating means and transmitted by said scanning phase grating and
    an optical reversing prism is provided, which is arranged to receive said light which has been transmitted by said scales and to direct said light back through said scales and through said scanning phase grating onto said photodetectors, whereby said light is diffracted further as it is transmitted back by said scales.

* * * * *